UNITED STATES PATENT OFFICE.

HENRY B. KENNER, OF NEW ORLEANS, LOUISIANA.

IMPROVEMENT IN MODES OF DESTROYING COCOA-GRASS.

Specification forming part of Letters Patent No. 3,296, dated October 9, 1843.

*To all whom it may concern:*

Be it known that I, HENRY BOLLINGER KENNER, of the city of New Orleans, Louisiana, have discovered a new and useful Plan or Method of Destroying the Cocoa-Grass—a grass well known by that name, which has caused many plantations in this State and in other States and Territories of the United States to be mere bog or waste land, untillable or unproductive of anything valuable.

I propose to reclaim and enrich and enliven these waste and injured lands, plantations, or parts of plantations by destroying the cocoa-grass, and in the process of destroying.

The nature of my discovery and plan or method of destroying the cocoa-grass consists in using as agents for that purpose the Palma-Christi nuts, (from which castor-oil is produced,) the hemp, and the Jamestown-weed seeds in the following manner, to wit: Plow the ground, which is seeded or set with the cocoa-grass, close, deep, and turn it well over early in the year, and after the disappearance of frost—say between the middle of March and the middle of April—sow in broadcast or close drills and harrow in the Palma-Christi nuts, so as to have a stand of at least one stalk to every twelve or eighteen inches square of ground, or so as to have the plants close enough to completely shade or cover the ground from the sun. On the spring following the same process must be repeated; or, instead thereof, it would be as good or a better plan to let the stalks stand through the winter with a sufficient quantity of nuts on them for a second crop, and about the disappearance of frost beat down stalks and nuts and plough them into the ground. About the same time in the third spring or year one of the foregoing processes must be repeated, and to which should be added a sowing of the hemp and Jamestown-weed seeds in sufficient quantities to make a tolerably dense stand of the hemp and Jamestown weeds. In each year or season the plants should be left to grow until frost, as nature directs. These processes will effectually destroy every sprig and nut of the cocoa-grass, and very essentially manure or enrich and enliven the soil.

I would particularly call attention to the using of the Palma-Christi nuts, hemp, and Jamestown-weed seeds on lands seeded or set with cocoa-grass, whether the farmers be sowing or planting in spring or any other season of the year, by means of plowing, spading, or otherwise.

That which I claim as my discovery, for which I desire to have Letters Patent, is—

The use or application of the Palma-Christi nuts, the hemp, and the Jamestown-weed seeds on or to lands, for the purpose of destroying the cocoa-grass therein.

H. B. KENNER.

Witnesses:
   VINCENT GALLAWAY,
   JOHN VALENTINE,
   RICHARD VALENTINE.